Patented Feb. 25, 1936

2,031,969

UNITED STATES PATENT OFFICE 2,031,969

METHOD OF PURIFYING GLASS SAND

Rob R. McGregor, Swissvale, and Edwin W. Tillotson, Pittsburgh, Pa., assignors to Macbeth-Evans Glass Company, Charleroi, Pa., a corporation of Pennsylvania No Drawing. Application August 30, 1934, Serial No. 742,144

4 Claims. (Cl. 252—8)

The invention relates to the treatment of glass sand to remove impurities, such as iron, titanium, etc., found in it.

At the quarries glass sand is so washed and treated that as it comes to glass factories it is as pure as most commercial chemicals, it usually containing not more than a total of one-half of 1 per cent impurities. Of these the most detrimental is iron which is present principally in the form of oxides. In ordinary glassware the presence of a small amount of iron is frequently not prejudicial, but it is objectionable in glass used for the transmission of light because even a small amount of iron in such glass absorbs ultra-violet rays. It is therefore important in the manufacture of glass for light-transmitting purposes to use glass sand which is as free as possible from iron.

Our invention is predicated upon our discovery that iron and other impurities may be removed from glass sand by first mixing it with a dissolving agent of the character hereinafter described, then heating the mixture to dissolve impurities of the sand, and thereafter treating the mixture with acid, or water or both, to remove the dissolved impurities, the characterizing feature of the invention being the heating of the mixture of sand and dissolving agent to dissolve impurities.

Glass sand which is treated according to our invention is preferably that which has been partially purified as by crushing, screening, washing with water, magnetic separation and treatment with acid. The sand may be advantageously treated by any one or more of these well-known procedures before being treated according to the method we provide.

The dissolving agent which is mixed with the sand is of such a character that it reacts with the impurities to a much greater extent than with the silica at the temperature at which the mixture is heated. Reagents which may be used are alkali borates, such as sodium tetraborate; alkali carbonates, such a sodium, potassium and lithium carbonates; and alkali phosphates, such as sodium and potassium phosphates. Of these it is preferred to use alkali borates, and particularly sodium tetraborate which we have found to be very effective.

When sodium tetraborate is used it may be from about 1 to 6 per cent of the mixture, depending in part upon the amount of impurities present in the sand. We have found that by forming a mixture of glass sand with about 2 per cent of sodium tetraborate and heating it to temperatures of from about 1000° to 2000° F. very substantial amounts of iron oxide can be removed from the mixture by its subsequent treatment. The heating temperature may be as low as about 800° F., although we have found that the best results are obtained at a temperature of about 1800° F. when sodium tetraborate is used as the dissolving agent. When other of the dissolving agents are used for forming the mixture, we have found that the mixture should be heated to a temperature of not more than about 1300° F. to effect the maximum removal of impurities. However, in no case should the temperature of heating be so high that the products of reaction become insoluble in the subsequent treatment. The mixture should be maintained at its elevated temperature for fifteen or more minutes to permit the dissolving action to take place.

The treatment, which is the final step of the procedure, may be effected by washing with water, preferably hot, or by extracting with a solution of acid. If effected by the latter the sand is subsequently washed with water, and in all cases it is finally dried. We have found that the final step when performed by extraction may be advantageously effected by the use of a 50 per cent hydrochloric acid solution followed by washing with water to remove the acid.

As an example of the practice of our invention, glass sand containing 0.013 per cent of iron oxide after being given a preliminary extraction treatment with 50 per cent hydrochloric acid was mixed with 2 per cent of sodium tetraborate and heated to a temperature of 1300° F. at which it was maintained for an hour. After being cooled it was washed with a 50 per cent hydrochloric acid solution and thereafter was found to contain only 0.006 per cent of iron oxide. Another example containing 0.021 per cent of iron oxide after being given a preliminary extraction treatment with 50 per cent hydrochloric acid was treated in the same way and found to contain only 0.002 per cent of iron oxide.

In referring to the action of the reagent added to the sand for the heating step, we have described it as a dissolving action, and it is so defined in the appended claims. It may be a real dissolving action or a chemical change that renders the impurities soluble in the subsequent washing treatment, and accordingly we desire to have it understood that its description as being a dissolving action is intended to cover whatever the real phenomena may be. Furthermore, while we have described our invention with particular reference to the removal of iron as an impurity, it will be understood that other impurities such as compounds of titanium, aluminum, zirconium, chromium, lime and magnesium are likewise removed, either with the iron or alone if there should happen to be no iron present.

According to the provisions of the patent statutes, we have explained the principle and mode of operation of our invention and have given specific examples of how it may be practiced. However, we desire to have it understood that within the scope of the appended claims the invention may be practiced otherwise than as specifically described.

We claim:

1. The method of removing iron from glass sand, comprising mixing a body of such sand with sodium tetraborate, heating the mixture to dissolve iron found in the sand, and thereafter treating the mixture to remove the dissolved iron.

2. The method of removing iron from glass sand, comprising mixing a body of such sand with about 2 per cent of sodium tetraborate, heating the mixture to a temperature of not less than about 800° F., and thereafter treating the mixture to remove the dissolved impurities.

3. The method as defined in claim 2 in which the treating of the mixture is effected by extraction with a hydrochloric acid solution.

4. The method of removing iron and other impurities from glass sand, comprising mixing a body thereof with a dissolving agent of the class consisting of alkali borates, alkali carbonates and alkali phosphates, heating the mixture to such temperature as to dissolve the impurities of the sand without substantial dissolving of the sand, and thereafter treating the mixture to remove the dissolved impurities.

ROB R. McGREGOR.
EDWIN W. TILLOTSON.